(12) United States Patent
Liu et al.

(10) Patent No.: US 12,674,742 B2
(45) Date of Patent: Jul. 7, 2026

(54) PORTABLE INTERNAL FRICTION MEASURING INSTRUMENT AND INTERNAL FRICTION MEASUREMENT METHOD

(71) Applicants: SUZHOU NUCLEAR POWER RESEARCH INSTITUTE CO., LTD., Suzhou (CN); CHINA GENERAL NUCLEAR POWER GROUP, Shenzhen (CN); CGN POWER CO., LTD., Shenzhen (CN)

(72) Inventors: Xiangbing Liu, Suzhou (CN); Yuanfei Li, Suzhou (CN); Chaoliang Xu, Suzhou (CN); Wenqing Jia, Suzhou (CN); Jian Yin, Suzhou (CN); Qiwei Quan, Suzhou (CN); Wangjie Qian, Suzhou (CN)

(73) Assignees: SUZHOU NUCLEAR POWER RESEARCH INSTITUTE CO., LTD., Suzhou (CN); CHINA GENERAL NUCLEAR POWER GROUP, Shenzhen (CN); CGN POWER CO., LTD., Shenzhen (CN)

( * ) Notice: Subject to any disclaimer, the term of this patent is extended or adjusted under 35 U.S.C. 154(b) by 256 days.

(21) Appl. No.: 18/725,144

(22) PCT Filed: Mar. 2, 2022

(86) PCT No.: PCT/CN2022/078777
§ 371 (c)(1),
(2) Date: Jun. 28, 2024

(87) PCT Pub. No.: WO2023/130554
PCT Pub. Date: Jul. 13, 2023

(65) Prior Publication Data
US 2025/0060304 A1 Feb. 20, 2025

(30) Foreign Application Priority Data

Jan. 4, 2022 (CN) .......................... 202210004241.8

(51) Int. Cl.
G01N 19/02 (2006.01)

(52) U.S. Cl.
CPC .................................... G01N 19/02 (2013.01)

(58) Field of Classification Search
CPC ........ G01N 19/02; G01N 3/317; G01N 3/068; G01N 3/38; G01N 2203/0062;
(Continued)

(56) References Cited

U.S. PATENT DOCUMENTS

| | | | | |
|---|---|---|---|---|
| 4,794,798 A | * | 1/1989 | Matsushita | ............... G01N 3/38 73/849 |
| 4,879,905 A | * | 11/1989 | Chen | ...................... G01N 29/12 73/579 |

FOREIGN PATENT DOCUMENTS

| | | | | |
|---|---|---|---|---|
| CN | 107024381 A | * | 8/2017 | ............... G01N 3/38 |
| CN | 110567877 A | * | 12/2019 | ............. G01N 21/17 |

(Continued)

OTHER PUBLICATIONS

International Search Report of PCT Patent Application No. PCT/CN2022/078777 issued on Jul. 28, 2022.
(Continued)

*Primary Examiner* — Marrit Eyassu
(74) *Attorney, Agent, or Firm* — Andrew C. Cheng

(57) ABSTRACT

A portable internal friction measuring instrument and internal friction measurement method, the portable internal friction measuring instrument comprising: a cavity (10), a sample fixture (20), a fixing plate (30), a heating plate (40), a thermal barrier cover (50), an excitation assembly (60), and a vibration sensor (70). The excitation assembly (60) comprises a rotatable vibration impeller (61), at least one
(Continued)

protrusion is provided on the outer wall of the vibration impeller (61), the lower edge of a sample (80) can be intermittently toggled by means of the protrusion during the rotation of the vibration impeller (61), and the vibration amplitude of the sample (80) is determined by using an angle difference between emitted light and reflected light of the sample (80), such that the technical effects of mechanical toggling to excite the vibration of the sample (80) and non-contact measurement of the vibration of the sample (80) are achieved.

19 Claims, 9 Drawing Sheets

(58) Field of Classification Search
CPC ... G01N 2203/0075; G01N 2203/0226; G01N 2203/0234; G01H 9/00
USPC .................................................................. 73/9
See application file for complete search history.

(56) References Cited

FOREIGN PATENT DOCUMENTS

| CN | 113030128 A | 6/2021 |
|---|---|---|
| GB | 590262 A | 7/1947 |
| WO | 2021224909 A1 | 11/2021 |

OTHER PUBLICATIONS

Office Action of CN Patent Application No. 202210004241.8 issued on Mar. 18, 2023.

* cited by examiner

PORTABLE INTERNAL FRICTION MEASURING INSTRUMENT AND INTERNAL FRICTION MEASUREMENT METHOD

TECHNICAL FIELD

The present invention relates to the field of measurement techniques, and more specifically to a portable internal friction measuring instrument and an internal friction measurement method.

BACKGROUND

Internal friction is a fundamental property that reflects intrinsic physical characteristics of a material, and just like other parameters, such as density, conductivity, permeability, and elastic modulus, is not affected by the shape, weight, and size of the material and is only determined by the state of inherent internal microscopic defect of the material.

Under the condition of being isolated from the surroundings, when a material, as being acted upon by an external force, generates deformation, and for materials that are free of defects, stress causes lattice distortion that induces strain and accumulates energy. When the stress is released, the lattice restores and the accumulated energy is released as kinetic energy, and thus, there is no loss of energy. For materials that has internal defects, material deformation makes the lattice distortion not completely converted into kinetic energy and is absorbed by a certain number of defects as work, resulting in energy loss, so that when the accumulated energy is released, a part of the kinetic energy becomes lost.

As such, measuring the internal friction and variation of elastic modulus of a material under certain external conditions (such as temperature, frequency, and amplitude) may reflect microscopic defect data of the material, acquiring microscopic defect parameters, such as defect concentration and distribution, defect diffusion activation energy, and phase transition dynamics. The internal friction technology is also commonly referred to as internal friction spectrum or mechanical spectrum.

Internal friction measurement is one of the most effective nondestructive testing measures that are currently employed to study the defect relaxation process and microscopic structure variation. There are various ways of measurement of internal friction, all of which require application of dynamic acting force on a macroscopic sample.

A method that is referred to forced vibration method is performed by applying, within a period of time, a periodic acting force to a sample and meanwhile measuring the stress-strain curve; a method that is referred to as free decay method is performed by applying, within a period of time, a linear acting force to reach a predetermined deformation and then releasing the acting force and measuring a strain decay curve; and a method that is referred to as formant method is performed by applying, within a period of time, a periodic acting force having a constantly varying frequency to a sample to measure a curve of strain amplitude varying with frequency. All these methods can be selectively used according to the characteristics of microscopic defects of the material.

In view of the fact that the internal friction is extremely sensitive to microscopic defect change of metallic materials, nondestructive inspection is of vital importance in the study of nuclear structural material radiation defect damage mechanism and material aging process.

Internal friction measurement is different from other nondestructive inspection in that its frequency range completely covers the intrinsic frequency range of slow transition of defects, and further, an exciting signal applied is an alternate stress (of which the amplitude is far less than the yield stress of the material), while a responsive signal is strain, and it is applicable to any object that transmits elastic stress wave and has been proven the most effective way for study of defect relaxation process and microstructure variation.

Having been developed for decades, the internal friction measurement methods have been continuously evolved and improved, wherein the forced vibration method, the free decay method, and the formant method have been widely used. In consideration of the adverse influence of external vibrations on the measurement, internal friction measuring and testing apparatuses designed and fabricated in known ways all have a bulky size, a heavy mass, and a large inertia making it hard to carry and thus limiting engineering field applications thereof, although it is good for use in research facility and colleges.

The known internal friction measuring structure and techniques still suffers the following problems when used in inspection of unclear material radiation damage surface defects:

(1) Excitation structure is complicated. To achieve significant strain amplitude excitation, a traditional electrostatic excitation system adopts combination of direct current high voltage and alternating signal to drive a sample to vibrate, and requires dedicated boost circuit, signal synthesis circuit, and high-frequency carrier circuit, making the structure of the circuitry portion sophisticated, and having a high demand for electric shielding and high-voltage isolation.

(2) Reliability is poor. Temperature rise during the course of testing may cause deformation of the sample, and the sample has to be kept at a predetermined distance from an excitation electrode or a sampling electrode when electric excitation and sampling is implemented, but in actual testing, to acquire effective signals, the sample is arranged very close to the two electrodes, and once deformed, the sample may get contact with the excitation electrode or the sampling electrode, and measurement will fail, making the apparatus unable to operate normally and the reliability is poor.

(3) Temperature variable measurement is hard to realize. High-precision displacement transducers adopted in the known internal friction equipment are generally capacitance-based, eddy current based, or transformer (linear variable differential transformer, LVDT) based transducers and such transducers must be arranged very close (in a millimeter order) to the sample or must be placed in contact with the sample, and under a condition of temperature variation, the sample itself, as well as the surroundings of the sample itself, may have a relatively high temperature, making the transducers fail to work, and in a worse condition, irreversible damage may occur on internal electronic components of the transducers, making it hard to realize temperature variable measurement.

The presence of the above problems not only affects the accuracy of quantitative data of physical parameters of internal friction, but also makes it hard to suit the need for on-site measurement of pile fuel cladding materials, impossible to measure elastic modulus, elastic modulus temperature coefficient, and damping of surface oxidation film or ion radiation material of the fuel cladding, and also difficult to inspect material defects, impossible to realize study for type, concentration and evolving mechanism of defects.

SUMMARY OF THE INVENTION

The purpose of the present invention is to alleviate the deficiency of the known techniques and to provide a portable internal friction measuring instrument that has a simple structure, good reliability, a wide range of applications, high measurement accuracy, and a wide working frequency, and is suitable for measurement of radiation defect characterization and is easy to carry. The present invention also provides an internal friction measurement method that has good reliability, high measurement accuracy, a wide range of applications, and a wide working frequency.

To achieve the above purpose, a product of a technical solution proposed in the present invention is a portable internal friction measuring instrument, which comprises:

a cavity, the cavity extending in an up-down direction, an upper end portion of the cavity being hermetically connected with a top cover that includes a handle, a lower end portion of the cavity being connected with a bottom seat, so as to hermetically enclose an interior of the cavity;

a sample fixture, the sample fixture being connected to the top cover and extending downwards, the sample fixture being operable to clamp an upper end portion of the plate-like sample;

a fixing plate, the fixing plate being connected to the bottom seat and extending upwards vertically;

a heating plate, the heating plate being connected to the fixing plate and located behind the sample, the heating plate being operable to heat a lower end portion of the sample;

the thermal barrier cover, the thermal barrier cover being connected to the fixing plate and enclosing the heating plate and the lower end portion of the sample, the thermal barrier cover being operable to form a local high-temperature region in the cavity; and an excitation assembly and a vibration sensor arranged in the cavity;

wherein the excitation assembly is operable to drive, by means of mechanical toggling, the lower end portion of the sample to generate vibration, the excitation assembly comprising a vibration impeller rotatably arranged under the sample, a rotation axis line of the vibration impeller being parallel to a plane on which the sample is located in a plumb state, the rotation axis line of the vibration impeller being also parallel to a horizontal surface, at least one protrusion being provided on an outer wall of the vibration impeller, so that during rotation of the vibration impeller, a lower edge of the sample is intermittently toggled by the protrusion to cause the lower end portion of the sample to generate vibration; the vibration sensor comprises an optical transducer, the vibration sensor being operable to emit light irradiating the sample and to receive light reflected from the sample, wherein the portable internal friction measuring instrument determines a vibration amplitude of the sample by measuring an angle difference between the emitting light and reflected light so as to realize measurement of internal friction.

Preferably, four thorn teeth are provided on the outer wall of the vibration impeller to protrude outward therefrom, and heights of the fourth thorn teeth are sequentially incremented in a clockwise direction.

Preferably, a front surface of the thermal barrier cover is formed with observation holes for the emitting light and the reflected light passing through.

Further preferably, the vibration sensor is fixed by a sideway mounting plate to a bottom seat, and a detection port of the vibration sensor faces the observation holes.

Further preferably, a variation range of an included angle between a plane on which the detection port is located and a plane on which the sample is located is ±15°, and the detection port is higher than a lower edge of the sample.

Further preferably, an axis line of the observation holes is perpendicular to a plane on which the sample is located in a plumb state.

Preferably, an observation window and electrical and vacuum flanged ports are provided on the cavity, wherein the observation window is arranged on a lower end portion of the cavity to correspond to the sample and the vibration impeller, and the electrical and vacuum flanged ports are located on a side opposite to the observation window.

Preferably, the sample fixture comprises a support rod, a slidable clamp, and a pressing sheet, wherein the support rod is of a cylindrical form; an upper end portion of the support rod is connected to the top cover and is coaxial with the top cover; the slidable clamp is connected, in an upwards/downwards slidable manner, to a lower end portion of the support rod; and the pressing sheet presses the upper end portion of the sample tightly on the slidable clamp.

Preferably, the thermal barrier cover comprises metal boxes arranged in a multiple-layer nested form, and the metal boxes have upper and lower surfaces in which openings through which the sample is penetrateable are formed.

Further preferably, adjacent ones of the metal boxes are fastened together by means of bolts, and adjusting the bolts varies distances between the adjacent ones of the metal boxes and distances between the metal boxes and the sample.

Preferably, the excitation assembly further comprises an excitation motor that drives the vibration impeller to rotate, and the excitation motor is arranged on the bottom seat.

To achieve the above purpose, a method of a technical solution proposed in the present invention is an internal friction measurement method, which comprises the following steps:

S1, placing a plate-like sample in a vacuum environment, and fixing an upper end portion of the plate-like sample to have a lower end portion of the plate-like sample vertically extending downwards;

S2, heating the lower end portion of the sample to a preset temperature;

S3, driving the lower end portion of the sample, by means of mechanical toggling, to generate vibration at a preset frequency; and S4, applying an optical transducer to emit light toward the lower end portion of the sample and receiving light reflected from the sample, and detecting an angle difference between the emitting light and the reflected light to calculate an amplitude of the sample to realize measurement of internal friction.

Preferably, in Step S3, a driving force applied by the mechanical toggling to the sample is in a direction that is perpendicular to a plane on which the sample is located in a plumb state.

Preferably, in Step S2, heating is implemented with radiation heating, and a range of the heating is confined within an area in which the lower end portion of the sample is located.

Preferably, the internal friction measurement method uses any portable internal friction measuring instrument described above to carry out measurement.

By adopting the above technical solution, the present invention presents, as compared with the prior art, the following advantages:

The portable internal friction measuring instrument provided in the present invention comprises a cavity, a sample fixture, a fixing plate, a heating plate, a thermal barrier cover, an excitation assembly, and a vibration sensor. The excitation assembly comprises a rotatable vibration impeller, and at least one protrusion is provided on an outer wall of the vibration impeller, so that during rotation of the vibration impeller, a lower edge of a sample is intermittently toggled by the protrusion. An optical transducer is adopted to serve as the vibration sensor, and a vibration amplitude of the sample is determined according to an angle difference between the emitting light and light reflected from the sample, so that technical effects of applying mechanical toggling to excite vibration of the sample and noncontact measurement of the vibration of the sample are realized. The structure is simple; the reliability is good; the range of application is wide; the measurement accuracy is high; the working frequency is wide; and the internal friction equipment can be integrated in a cavity having a relatively small size for easy carrying and being suitable for on-site measurement of radiation defect representation. The internal friction measurement method provided in the present invention implements mechanical toggling excited vibration and noncontact measurement, and the reliability is good, the measurement accuracy is high, the range of application is wide, and the working frequency is wide.

DETAILED DESCRIPTION OF PREFERRED EMBODIMENTS

A detailed description of a preferred embodiment of the present invention will be provided below with reference to the attached drawing to allow artisans of the technical field to readily appreciate the advantages and features of the present invention, so as to better and more clearly define the protection scope of the present invention.

Figure 1:
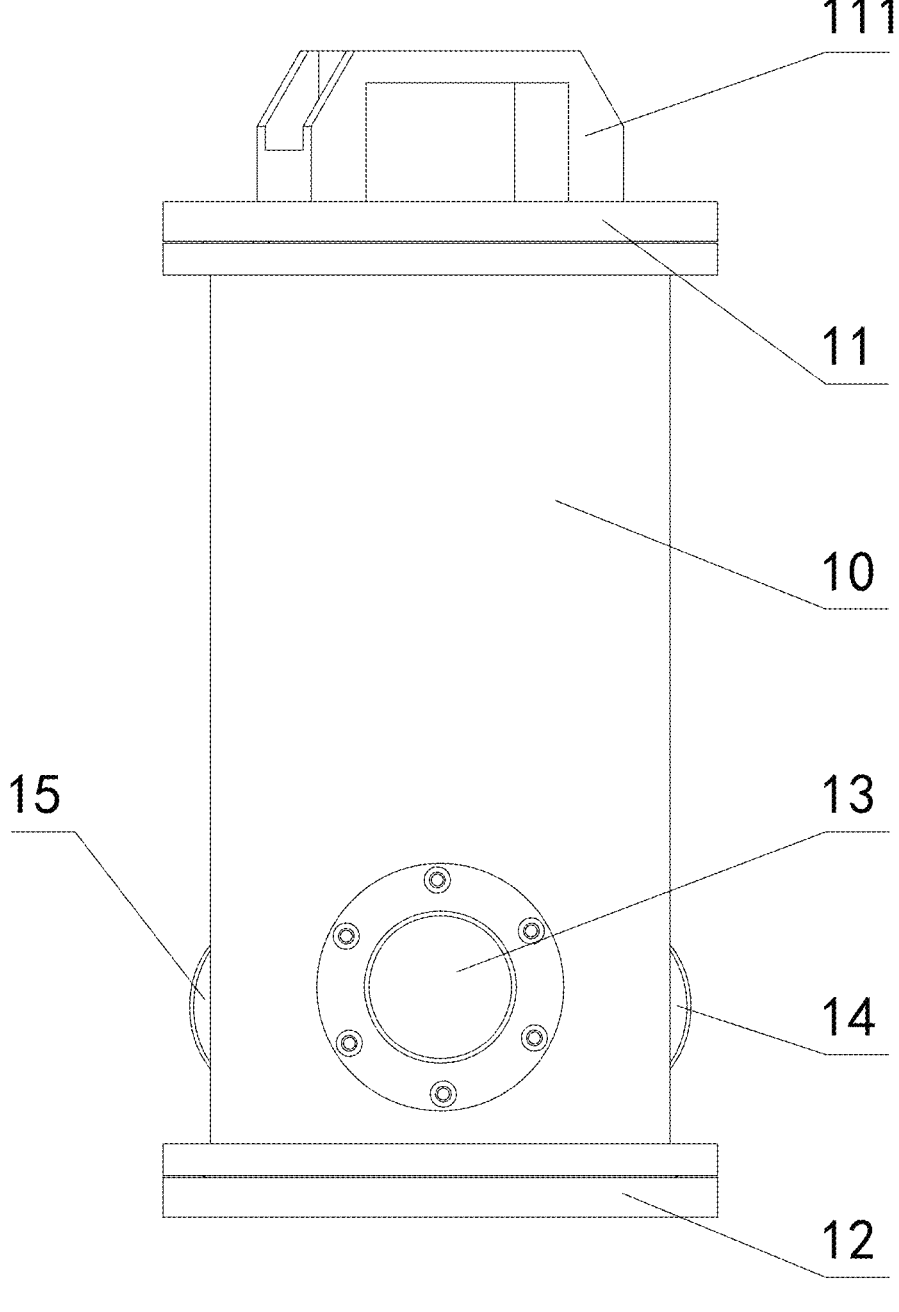
FIG. 1 is a schematic front view of a portable internal friction measuring instrument according to a preferred embodiment of the present invention.
Figure 2:
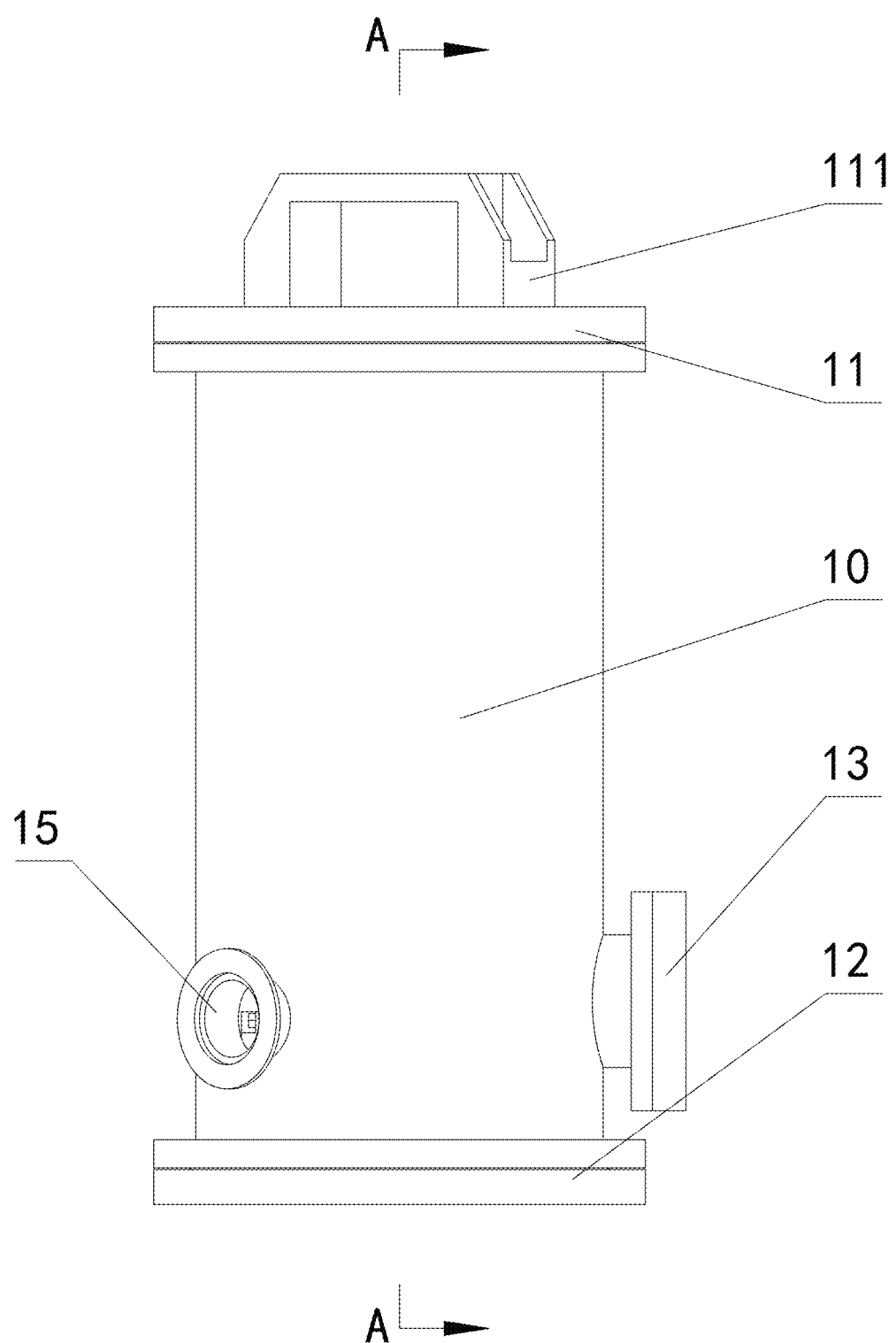
FIG. 2 is a schematic left-side elevational view of FIG. 1.
Figure 3:
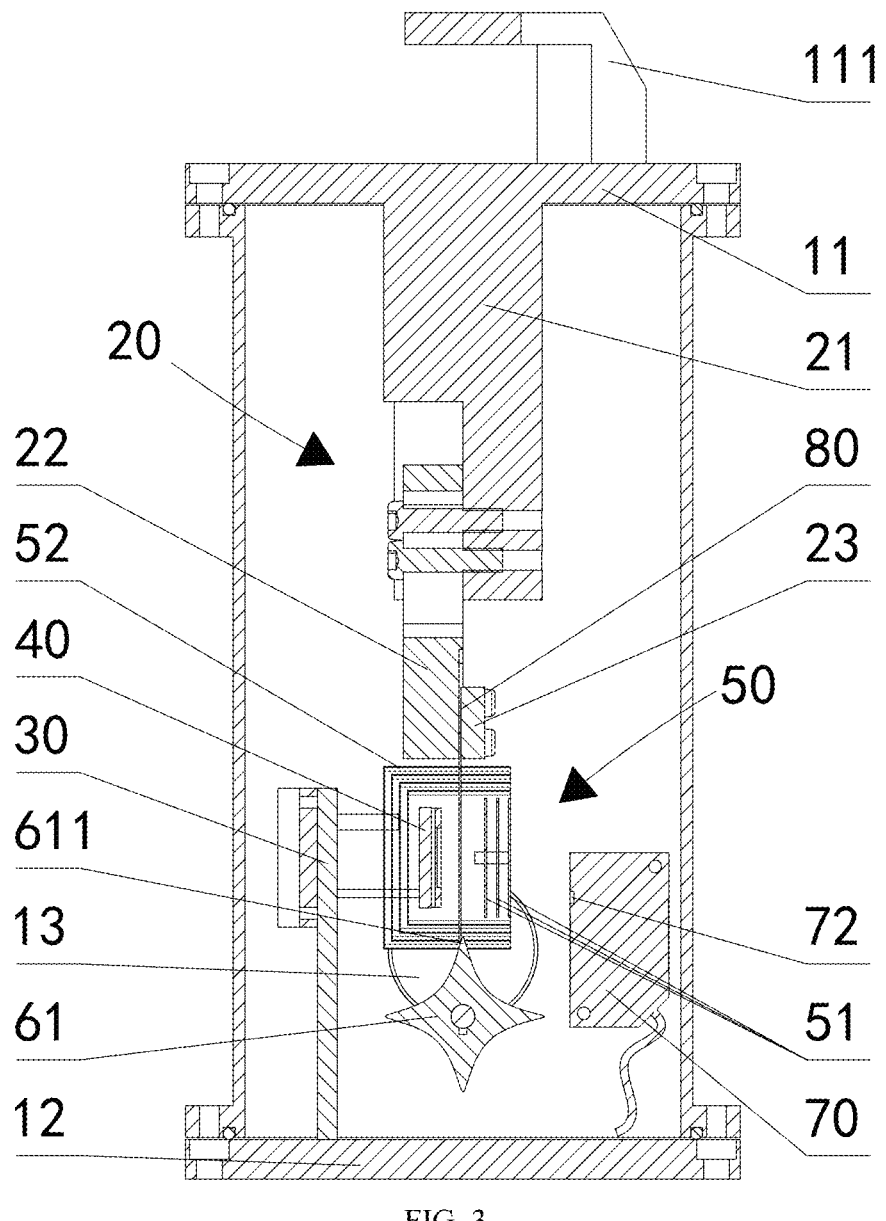
FIG. 3 is a schematic cross-sectional view taken in direction A-A of FIG. 2.
Figure 4:
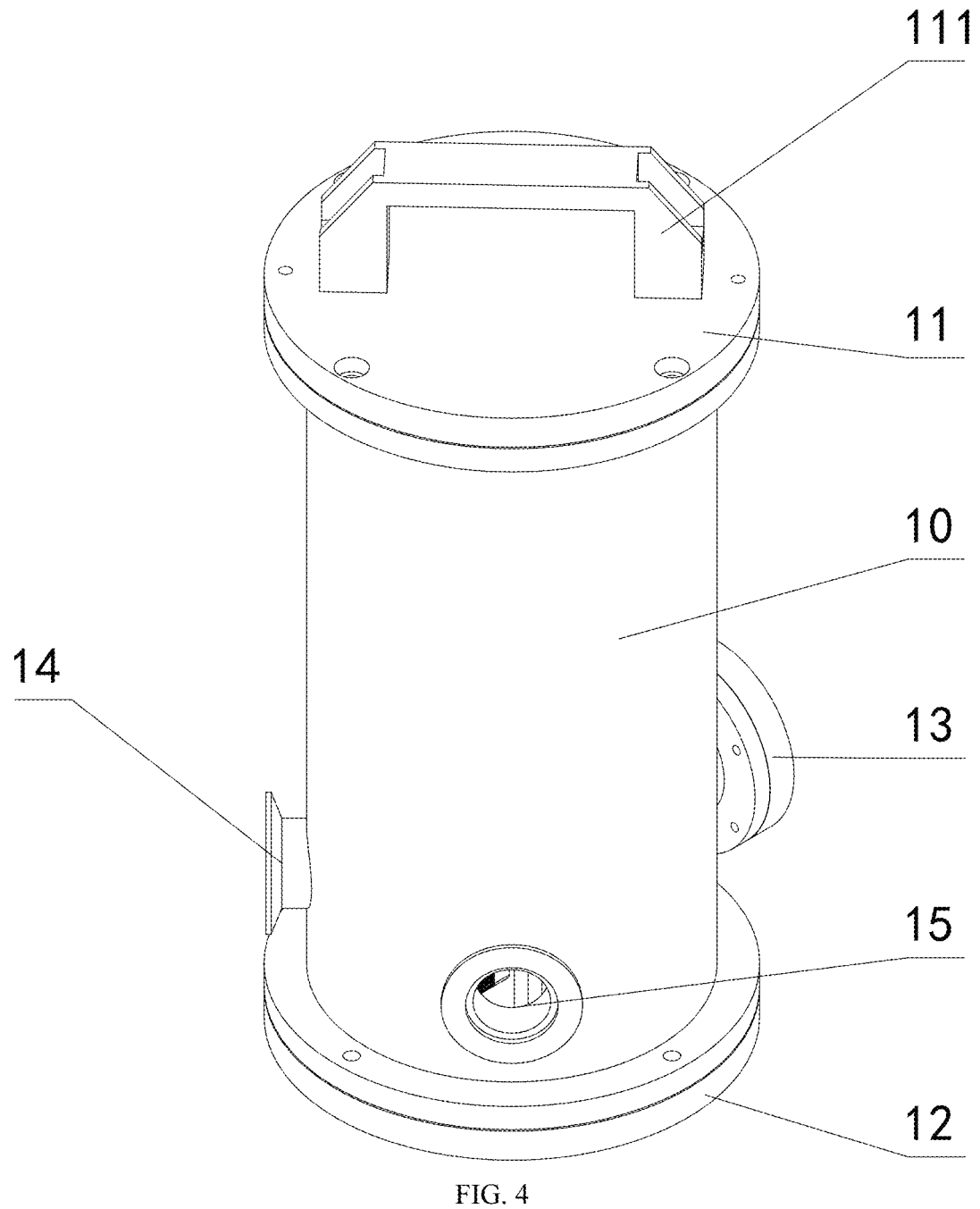
FIGS. 4, 5, and 6 are schematic perspective view of FIG. 1, wherein for easy observation, a cavity is omitted in FIGS. 5 and 6.
Figure 5:
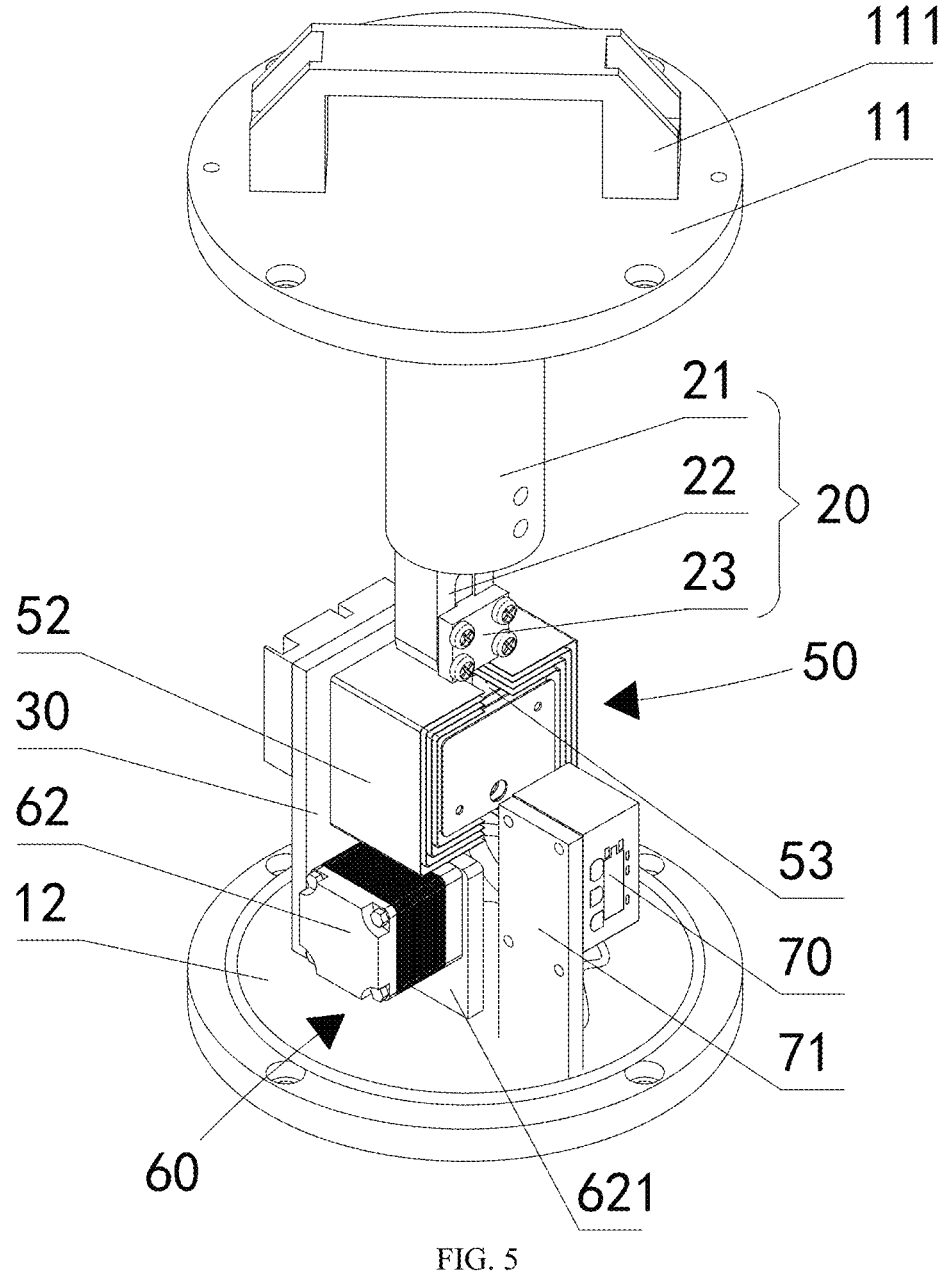
Figure 6:
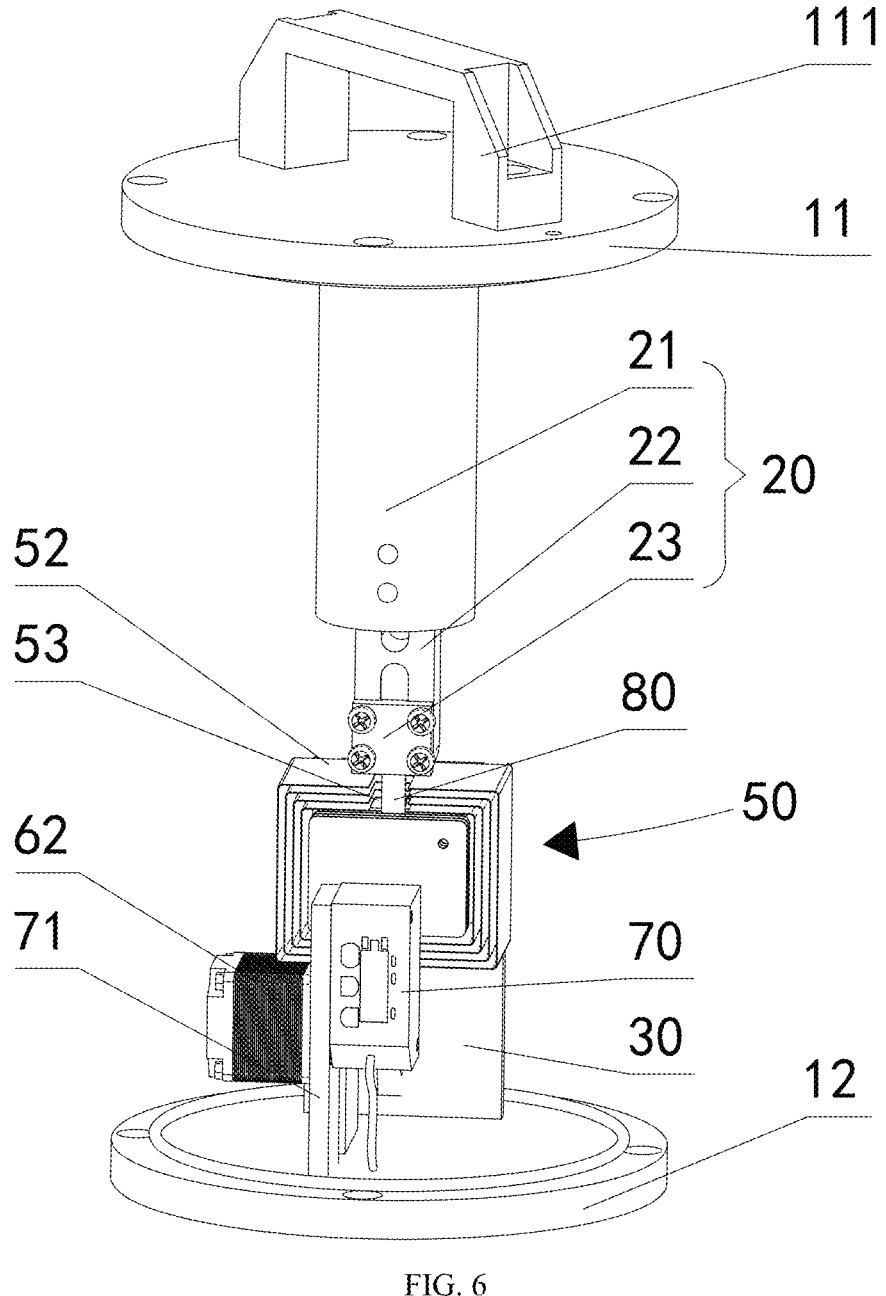

An up-down direction recited in the description of the present invention refers to an up-down direction illustrated in FIG. 1; a left-right direction recited in the description of the present invention refers to a left-right direction illustrated in FIG. 1; and a front-rear direction recited in the description of the present invention refers to a right-left direction illustrated in FIG. 2.

As shown in FIGS. 1-6, the present invention provides a portable internal friction measuring instrument, which comprises: a cavity 10, a sample fixture 20, a fixing plate 30, a heating plate 40, a thermal barrier cover 50, an excitation assembly 60, and a vibration sensor 70, wherein the cavity 10 extends in an up-down direction, and an upper end portion of the cavity 10 is hermetically connected with a top cover 11 that includes a handle 111, while a lower end portion of the cavity 10 is hermetically connected with a bottom seat 12 so as to hermetically enclose an interior of the cavity 10. An observation window 13, an electrical flanged port 14 and a vacuum flanged port 15 are provided on an outer wall of the lower end portion of the cavity 10. The electrical flanged port 14 and the vacuum flanged port 15 are located on a side opposite to the observation window 13 and are symmetrically arranged. The sample fixture 20, the fixing plate 30, the heating plate 40, the thermal barrier cover 50, the excitation assembly 60, and the vibration sensor 70 are all arranged in the cavity 10. The arrangement of the electrics flanged port 14 allows the heating plate 40, the excitation assembly 60, and the vibration sensor 70 that are arranged in the cavity to easily connect to external circuits, and the arrangement of the vacuum flanged port 15 allows the cavity 10 to be easily evacuated for vacuum so as to achieve isolation of a sample from the external environment. The sample fixture 20 is connected to the top cover 11 and extends downwards. The sample fixture 20 functions to clamp an upper end portion of a plate-like sample 80. Specifically, the sample fixture 20 comprises a support rod 21, a slidable clamp 22, and a pressing sheet 23. The support rod 21 is of a cylindrical form. An upper end portion of the support rod 21 is fixed, by means of welding or screws, to a middle position of a back side of the top cover 11. The support rod 21 is coaxial with the top cover 11 for easy mounting of the sample 80 and also ensuring sufficient robustness of the sample fixture 20. The slidable clamp 22 is connected, in an upwards/downwards slidable manner, to a lower end portion of the support rod 21. Arranged between the slidable clamp 22 and the support rod 21 are bolts that fix relative positioning of the slidable clamp 22 and the support rod 21. A sliding channel structure is formed in a middle portion of the slidable clamp 22. The pressing sheet 23 presses the upper end portion of the sample 80 tightly in the sliding channel structure. The pressing sheet 23 and the slidable clamp 22 are fastened together by means of bolts. Adjusting a position of the slidable clamp 22 in the up-down direction varies a position of the lower end portion (free end) of the sample 80. The fixing plate 30 is connected to the bottom seat 12 and extends upwards vertically. The fixing plate 30 functions to support the heating plate 40 and the thermal barrier cover 50. Specifically, the heating plate 40 is fastened, by means of bolts, to the fixing plate 30, and the heating plate 40 is made in the form of a flat plate located below the slidable clamp 22 and the pressing sheet 23 and exactly behind the sample 80 to carry out heating to the lower end portion of the sample 80, so as to make temperature rise of the sample 80 faster and more uniform. The thermal barrier cover 50 is connected to the fixing plate 30 and encloses the heating plate 40 and the lower end portion of the sample 80. The thermal barrier cover 50 functions to form a local high-temperature region in the cavity 10. Heating made to the lower end portion of the sample 80 in the vacuum environment is radiation heating, and generally does not affect other components in the cavity 10 as it is reflected back by the thermal barrier cover 50. The excitation assembly 60 applies a mechanical toggling mechanism to drive the lower end portion of the sample 80 to vibrate. Specifically, the excitation assembly 60 comprises a vibration impeller 61 and an excitation motor 62 that drives the vibration impeller 61 to rotate. The excitation motor 62 is fixed, by means of a motor fixing plate 621, to the bottom seat 12. The vibration impeller 61 is located exactly under the sample 80 and is fixed to a transmission axle of the excitation motor 62. The rotation axis line of the vibration impeller 61 is parallel to a plane on which the sample 80 is located in a plumb state. The rotation axis line of the vibration impeller 61 is also parallel to a horizontal surface. At least one protrusion is provided on an outer wall of the vibration impeller 61, and a lower edge of the sample 80 is intermittently toggled by the protrusion when the vibration impeller 61 is rotating, so that the lower end portion of the sample 80 is caused to vibrate. In the instant embodiment, the outer wall of the vibration impeller 61 is provided with four thorn teeth 611 that protrude outwards, and the thorn teeth 611 make up the protrusion. The four thorn teeth 611 are arranged at intervals, and heights of the four thorn teeth 611 are increased in sequence in a clockwise direction, and adjacent ones of the thorn teeth 611 are connected by means of a smooth curved surface. The vibration impeller 61 is made of a metallic material, and when the vibration impeller 61 is rotating, the thorn teeth 611 toggle the lower end portion of the sample 80 to cause the lower end portion of the sample 80 to vibrate. The observation window 13 faces the sample 80 and the vibration impeller 61 to allow a user to observe the process of measurement. The vibration sensor 70 is an optical transducer, and the vibration sensor 70 is fixed, by means of a sideway mounting plate 71, to the bottom seat 12. The vibration sensor 70 functions to emit light irradiating the sample 80 and to receive light reflected from the sample 80. The portable internal friction measuring instrument measures an angle difference of the emitting light and the reflected light to determine a vibration amplitude of the sample 80, in order to realize measurement of internal friction.

An advantage of such an arrangement is that a technical effect of exciting a sample to vibrate through mechanical toggling and noncontact measurement of the vibration of the sample can be achieved, and the structure is simple, reliability is good, a range of applications is wide, measurement accuracy is high, and working frequency is wide, and an internal friction instrument is allowed to be integrated in a relatively small cavity for easy carrying, making it suitable for on-site measurement of radiation defect representation.

In the instant embodiment, the thermal barrier cover 50 comprises metal boxes 52 arranged in a multiple-layer nested form. The metal boxes 52 are made up of thin metal plates, and the metal boxes 52 are formed, in upper and lower surfaces, with openings 53 through which the sample 80 may pass. Adjacent ones of the metal boxes 52 are fastened together by means of bolts, and adjusting the bolts varies distances between adjacent ones of the metal boxes 52 and those between the metal boxes 52 and the sample 80, so that the sizes of the openings 53 can be adjusted according to the thickness of the sample 80, and contact with the sample 80 can be prevented to not interfere with the vibration of the sample 80. Observation holes 51 are further formed in front surfaces of the thermal barrier cover 50 for passage of emitting light and reflected light. The observation holes 51 have an axis line that is perpendicular to the plane on which the sample 80 is located in the plumb state. A detection port 72 of the vibration sensor 70 is in alignment with the observation holes 51, and the detection port 72 functions to emit light irradiating the sample 80 and to receive light reflected from the sample 80. To avoid a situation where the reflected light extends outside of the detection port 72, an included angle between a plane on which the detection port 72 is located and a plane on which the sample 80 is located has a variation range of ±15°. The detection port 72 is set higher than the lower edge of the sample 80.

With the excitation motor 62 driving the vibration impeller 61 to rotate, the thorn teeth 611 provided on the vibration impeller 61 cause the sample 80 to vibrate at a predetermined frequency, amplitude, and temperature, and the vibration sensor 70 collects vibration signals of the sample 80 and acquires a time spectrum of vibration displacement of the sample 80 so as to calculate parameters of the material of the sample, such as damping and modulus and, combined with temperature spectrum, frequency spectrum, and amplitude spectrum data of the internal friction and modulus, obtain information with respect to type, excitation energy, and concentration of the microscopic defects of the material.

The vibration sensor 70 adopts an optical transducer that applies a noncontact way of irradiating light on a surface of the sample 80 and collects reflected light from the sample 80 to measure a minute variation of the angle of the reflected light so that the precision of measurement may reach a distinguishability of sub-micrometer, or even nanometer, level, and has a small size, making it particularly suitable for constructing a portable internal friction measuring instrument to be used for on-site measurement of material internal friction, measurement of modulus, and inspection of defects. To use, emitting light passes through the observation holes 51 at the bottom of the thermal barrier cover 50 to irradiate the surface of the lower end of the sample 80 to clearly measure the vibration process of the sample 80.

The portable internal friction measuring instrument according to the instant embodiment can be easily carried to the site of a nuclear reaction pile to carry out on-site measurement of elastic modulus, elastic modulus temperature coefficient, and damping of a material that presents danger and is not good for transportation, such as a fuel cladding material that shows a certain dose of radiation, and may provide clear and reliable equipment support for study of material radiation defect damage and dynamics processes.

The following provides a description for an operation process of the above-described portable internal friction measuring instrument, and the operation process comprises:

(1) Opening cavity: removing fastening bolts between a top cover flange and the cavity, and lifting up the top cover flange to be positioned horizontally on a support rack on an experiment table;

(2) Mounting sample: twisting loose pressing sheet bolts and inserting one end of a sample to be tested into a gap between the pressing sheet and the slidable clamp, and then twisting tight clamp bolts to securely hold the sample, wherein in case that an excitation amplitude or frequency has to be changed, a clamped length of the sample and a fastening location of the slidable clamp can be adjusted;

(3) Closing cavity: slowly placing the top cover flange with installed sample, by means of a positioning pin thereof, into the cavity until the top cover flange is positioned closely on a cavity flange, and observing, through the observation window, whether a free end of the sample is in contact with the thermal barrier cover or not, and if it is not, then tightening the bolts of the top cover flange;

(4) Evacuating for vacuum: in case that tests are to be carried out in a vacuum environment, connecting the vacuum flanged port on the bottom of the cavity to a vacuum pump assembly to carry out evacuation for vacuum, wherein the vacuum pump assembly and a vacuum gauge are connected externally;

(5) Connecting electrical wires: connecting electrical connectors for heating, measuring, and exciting to the electrical flanged portat the bottom of the cavity;

(6) Setting up parameters; activating electrical power and computer-end test software, setting up parameters, such as test temperature, excitation frequency, amplitude, and test time, and proceeding with trial vibration of the sample to obtain, initially, parameters of the material, such as modulus and elastic modulus;

(7) Conducting automatic testing: clicking an automatic test button to transmit excitation signals and collect vibration signals, and calculating values of internal friction and elastic modulus to obtain a result and performing analysis; and (8) Shutting system down: terminating testing and stopping testing procedure, and deactivating the test software and the electrical power.

The principle of the above test is that the procedure drives the excitation motor to cause the thorn teeth on the vibration impeller to force the free end of the sample to displace, and after the thorn teeth disengage from the free end of the sample, the sample is allowed to perform a free decay motion, or alternatively, high frequency driving is applied to make the vibration impeller rotate at a high speed to force the sample to perform forced vibration, and the vibration sensor is operated to collect a vibration curve or amplitude signal of the sample, so as to obtain an amplitude-time curve and an amplitude-frequency curve of the sample and calculate the parameters, such as damping and elastic modulus of the material, and, according to variation curves of the damping and elastic modulus of the sample varying with temperature, frequency and amplitude, information with respect to type, concentration, and excitation energy of the microscopic defects of the material can be obtained.

The present invention provides an internal friction measurement method, which comprises the following steps:

S1, placing a plate-like sample in a vacuum environment, and fixing an upper end portion of the plate-like sample to have a lower end portion of the plate-like sample vertically extending downwards;

S2, heating the lower end portion of the sample to a preset temperature,

S3, Driving the lower end portion of the sample, by means of mechanical toggling, to generate vibration at a preset frequency; and S4, applying an optical transducer to emit light toward the lower end portion of the sample and receiving light reflected from the sample, and detecting an angle difference between the emitting light and the reflected light to calculate a vibration amplitude of the sample to realize measurement of internal friction.

Preferably, in Step S3, a driving force applied by the mechanical toggling to the sample is in a direction that is perpendicular to a plane on which the sample is located in a plumb state.

Preferably, in Step S2, heating is implemented with radiation heating, and a range of the heating is confined within an area in which the lower end portion of the sample is located.

Preferably, the internal friction measurement method uses the above-described portable internal friction measuring instrument to carry out measurement.

The method abandons implementation of electrostatic excitation and electrode based measurement and has good reliability, high measurement accuracy, wide range of applications, and broad working frequency.

The following provides an illustration with reference to specific testing of a sample.

Figure 7:
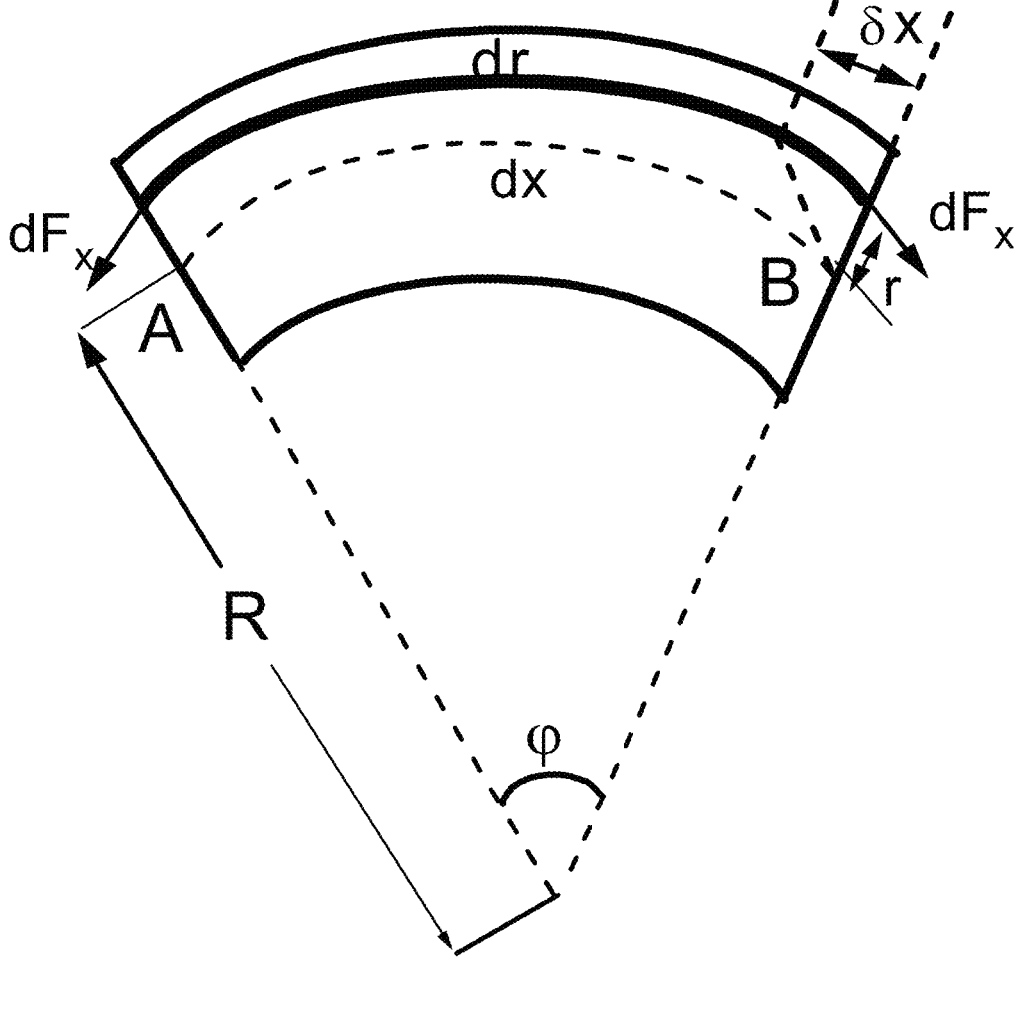
FIG. 7 is a force analysis diagram for a sample that is being bent.

A plate-like sample having a thickness between 20-250 μm, a width between 2-6 mm, and a length between 15-70 mm is used to perform the testing. The upper end portion of the sample is clamped, and the lower end portion of the sample is pushed by the thorn teeth of the vibration impeller to generate an acting force that is perpendicular to a thickness direction of the sample, so as to cause the sample to elastically deformation and thus bend. With the vibration impeller rotating to a predetermined angle, tooth tips of the thorn teeth disengage and separate from the deformed sample, so that the sample is driven by its own elasticity to dynamically oscillate until it restores the original plumb balance state. As shown in FIG. 7, when the plate-like sample material is acted upon by a point acting force or a surface acting force in the thickness direction, the material on the side that the acting force contacts is stretched, while the material on the back side is compressed, so that in a cross section in the thickness direction, it can be observed that a plane indicated by a neutral line in the thickness direction is essentially free of deformation. According to Hooke's elastic law and the continuity equation, a solution can be found and a calculation formula for Young's modulus of the plate-like sample is as follows:

$$E = \frac{4\pi^2 l^2 \rho S f_n^2}{M_n^4 I},$$

where l is the length of vibration of the sample; d is the thickness of the sample; f is the vibration frequency of the sample (where a first-order resonance frequency is often applied); and Mn is characteristic constant.

A damping calculation formula is as follows:

$$Q^{-1} = \frac{1}{2\pi}\left(1 - e^{-2\delta}\right),$$

where δ is logarithmic decrement of the vibration amplitude.

Figure 8:
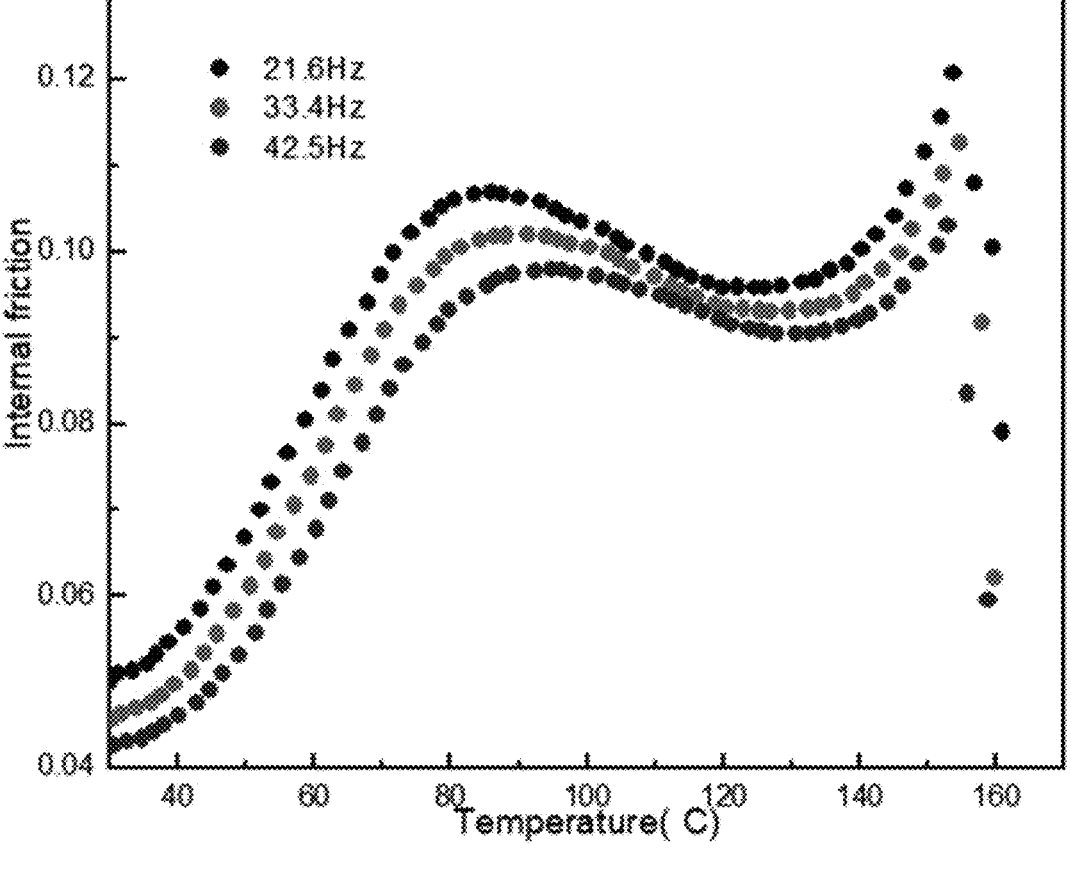
FIG. 8 is an internal friction-temperature spectrum of various samples.
Figure 9:
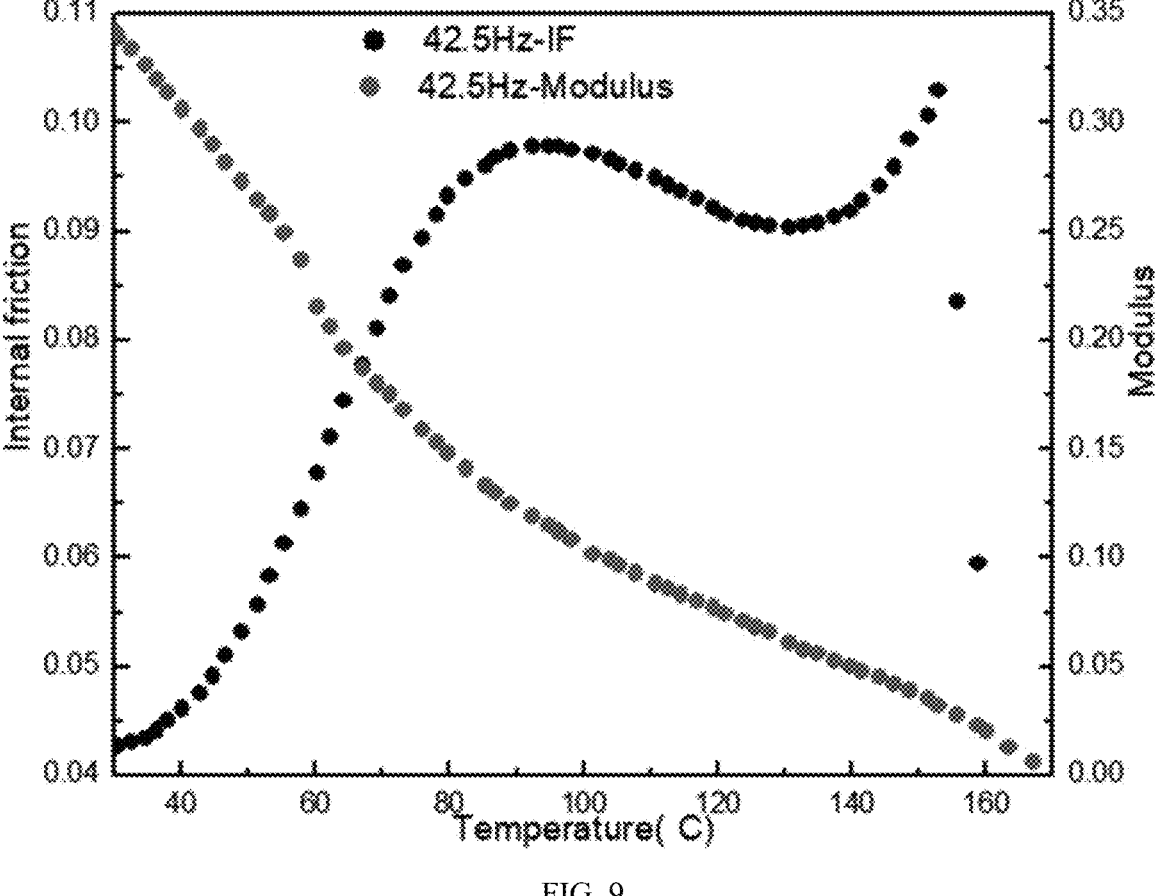
FIG. 9 is an internal friction-temperature spectrum and a modulus-temperature spectrum of a sample, Reference Numerals: 10. cavity; 11. top cover; 111. handle; 12. bottom seat; 13. observation window; 14. electrical flanged port; 15. vacuum flanged port; 20. sample fixture; 21. support rod; 211. mounting surface; 22. slidable clamp; 23. pressing sheet; 30. fixing plate; 40. heating plate; 50. thermal barrier cover; 51. observation holes; 52. metal boxes; 53. openings; 60. excitation assembly; 61. vibration impeller; 611. thorn tooth; 62. excitation motor; 621. motor fixing plate; 70. vibration sensor; 71. sideway mounting plate; 72. detection port; 80. sample.

E is a material intrinsic attribute and does not vary with the length, thickness, and shape of the material. When the length l changes, the measurement frequency also changes. As shown in FIG. 8, the longer the free end length is, the lower the resonance frequency will be. With the internal friction curves obtained by means of measurement of the material at different frequencies and temperatures as shown in FIG. 9, further study can be made on the microscopic mechanism and dynamic processes reflected by the corresponding internal friction peak, showing an important value of applications in the field of evaluation of radiation aging resistance of the nuclear reaction pile material.

The above embodiments are provided for illustrating the technical concept and features of the present invention, and the purpose is to allow those familiar with the technology to understand and implement the contents of the present invention, but is not intended to limit the scope of protection for the present invention. Equivalent variations or modifications that are made according to the spirits of the present invention are covered by the protection scope of the present invention.

The invention claimed is:

1. A portable internal friction measuring instrument, comprising a closed cavity extending in an up-down direction, and the cavity including a sample fixture, a heating plate, a thermal barrier cover, an excitation assembly, and a vibration sensor arranged in the cavity, wherein the sample fixture is configured to clamp an upper end portion of a sample made in a form of a plate, the heating plate configured to heat a lower end portion of the sample, the thermal barrier cover enclosing the heating plate and the lower end portion of the sample, in order to form a local high-temperature region in the cavity, the excitation assembly is configured to drive, by means of mechanical toggling, the lower end portion of the sample to generate vibration, the excitation assembly comprising a vibration impeller having a rotation axis line that is parallel to a plane on which the sample is located in a plumb state and a horizontal surface, at least one protrusion being provided on an outer wall of the vibration impeller, wherein during rotation of the vibration impeller, a lower edge of the sample is intermittently toggled by the at least one protrusion to cause the lower end portion of the sample to generate vibration, the vibration sensor is configured to emit light to irradiate the sample and to receive light reflected from the sample, wherein a vibration amplitude of the sample is determined by measuring an angle difference between the emitted light and the reflected light so as to realize measurement of internal friction.

2. The portable internal friction measuring instrument according to claim 1, wherein four thorn teeth are provided on the outer wall of the vibration impeller to protrude outward therefrom, and heights of the four thorn teeth are sequentially incremented in a clockwise direction.

3. An internal friction measurement method, uses the portable internal friction measuring instrument according to claim 2 to carry out measurement, characterized by comprising the following steps:

S1, placing a plate shaped sample in a vacuum environment, and fixing an upper end portion of the sample to have a lower end portion of the sample vertically extending downwards;

S2, heating the lower end portion of the sample to a preset temperature;

S3, driving the lower end portion of the sample, by means of mechanical toggling, to generate vibration at a preset frequency; and S4, applying an optical transducer to emit light toward the lower end portion of the sample and receiving light reflected from the sample, and detecting an angle difference between the emitted light and the reflected light to calculate a vibration amplitude of the sample to realize measurement of internal friction.

4. The portable internal friction measuring instrument according to claim 1, wherein the thermal barrier cover is formed with observation holes for the emitted light and the reflected light passing through, the observation holes and the heating plate being respectively located at front and rear sides of the sample.

5. The portable internal friction measuring instrument according to claim 4, wherein the observation holes have an axis line that is perpendicular to the plane on which the sample is located in the plumb state.

6. The portable internal friction measuring instrument according to claim 5, wherein the vibration sensor is provided with a detection port in alignment with the observation holes, the detection port being higher than the lower edge of the sample, a variation range of an included angle between a plane on which the detection port is located and a plane on which the sample is located being #15°.

7. An internal friction measurement method, uses the portable internal friction measuring instrument according to claim 6 to carry out measurement, characterized by comprising the following steps:

S1, placing a plate shaped sample in a vacuum environment, and fixing an upper end portion of the sample to have a lower end portion of the sample vertically extending downwards;

S2, heating the lower end portion of the sample to a preset temperature;

S3, driving the lower end portion of the sample, by means of mechanical toggling, to generate vibration at a preset frequency; and S4, applying an optical transducer to emit light toward the lower end portion of the sample and receiving light reflected from the sample, and detecting an angle difference between the emitted light and the reflected light to calculate a vibration amplitude of the sample to realize measurement of internal friction.

8. An internal friction measurement method, uses the portable internal friction measuring instrument according to claim 5 to carry out measurement, characterized by comprising the following steps:

S1, placing a plate shaped sample in a vacuum environment, and fixing an upper end portion of the sample to have a lower end portion of the sample vertically extending downwards;

S2, heating the lower end portion of the sample to a preset temperature;

S3, driving the lower end portion of the sample, by means of mechanical toggling, to generate vibration at a preset frequency; and S4, applying an optical transducer to emit light toward the lower end portion of the sample and receiving light reflected from the sample, and detecting an angle difference between the emitted light and the reflected light to calculate a vibration amplitude of the sample to realize measurement of internal friction.

9. The portable internal friction measuring instrument according to claim 4, wherein the thermal barrier cover comprises metal boxes arranged in a multiple-layer nested form, and the metal boxes are formed, in upper and lower surfaces, with openings for the sample to penetrate through.

10. The portable internal friction measuring instrument according to claim 9, wherein adjacent ones of the metal boxes are fastened together by means of bolts, and adjusting the bolts varies distances between the adjacent ones of the metal boxes and distances between the metal boxes and the sample.

11. An internal friction measurement method, uses the portable internal friction measuring instrument according to claim 9 to carry out measurement, characterized by comprising the following steps:

S1, placing a plate shaped sample in a vacuum environment, and fixing an upper end portion of the sample to have a lower end portion of the sample vertically extending downwards;

S2, heating the lower end portion of the sample to a preset temperature;

S3, driving the lower end portion of the sample, by means of mechanical toggling, to generate vibration at a preset frequency; and S4, applying an optical transducer to emit light toward the lower end portion of the sample and receiving light reflected from the sample, and detecting an angle difference between the emitted and the reflected light to calculate a vibration amplitude of the sample to realize measurement of internal friction.

12. An internal friction measurement method, uses the portable internal friction measuring instrument according to claim 4 to carry out measurement, characterized by comprising the following steps:

S1, placing a plate shaped sample in a vacuum environment, and fixing an upper end portion of the sample to have a lower end portion of the sample vertically extending downwards;

S2, heating the lower end portion of the sample to a preset temperature;

S3, driving the lower end portion of the sample, by means of mechanical toggling, to generate vibration at a preset frequency; and S4, applying an optical transducer to emit light toward the lower end portion of the sample and receiving light reflected from the sample, and detecting an angle difference between the emitted light and the reflected light to calculate a vibration amplitude of the sample to realize measurement of internal friction.

13. The portable internal friction measuring instrument according to claim 1, wherein an upper end portion of the cavity is connected to a top cover that includes a handle, and the sample fixture is connected to the top cover and extends downwards therefrom.

14. The portable internal friction measuring instrument according to claim 13, wherein the sample fixture comprises a support rod, a slidable clamp, and a pressing sheet, wherein the support rod is of a cylindrical form; an upper end portion of the support rod is connected to the top cover and is coaxial with the top cover; the slidable clamp is connected, in an upwards/downwards slidable manner, to a lower end portion of the support rod; and the pressing sheet presses the upper end portion of the sample tightly on the slidable clamp.

15. The portable internal friction measuring instrument according to claim 1, wherein a lower end portion of the cavity is connected to a bottom seat, and a fixing plate that extends upwards vertically and a sideway mounting plate are connected to the bottom seat, the fixing plate being arranged to fix the heating plate and the thermal barrier cover, the sideway mounting plate being arranged to fix the vibration sensor, the bottom seat being further provided with an excitation motor mounted thereon to drive the vibration impeller to rotate.

16. The portable internal friction measuring instrument according to claim 1, wherein an observation window and electrical and vacuum flanged ports are provided on the cavity, wherein the observation window is arranged on a lower end portion of the cavity to correspond to the sample and the vibration impeller, and the electrical and vacuum flanged ports are located on a side opposite to the observation window.

17. An internal friction measurement method, uses the portable internal friction measuring instrument according to claim 1 to carry out measurement, comprising the following steps:

S1, placing a plate shaped sample in a vacuum environment, and fixing an upper end portion of the sample to have a lower end portion of the sample vertically extending downwards;

S2, heating the lower end portion of the sample to a preset temperature,

S3, driving the lower end portion of the sample, by means of mechanical toggling, to generate vibration at a preset frequency; and S4, applying an optical transducer to emit light toward the lower end portion of the sample and receiving light reflected from the sample, and detecting an angle difference between the emitted light and the reflected light to calculate a vibration amplitude of the sample to realize measurement of internal friction.

18. The internal friction measurement method according to claim 17, wherein in Step S3, a driving force applied by the mechanical toggling to the sample is in a direction that is perpendicular to a plane on which the sample is located in a plumb state.

19. The internal friction measurement method according to claim 17, wherein in Step S2, heating is implemented with radiation heating, and a range of the heating is confined within an area in which the lower end portion of the sample is located.

* * * * *